United States Patent [19]

Embling

[11] 3,803,596

[45] Apr. 9, 1974

[54] TELEVISED TRUE-MOTION RADAR WITH TRACK HISTORY

[75] Inventor: Clifford Arthur Embling, Buckhurst Hill, England

[73] Assignee: Smith Industries Limited, London, England

[22] Filed: Mar. 1, 1971

[21] Appl. No.: 119,788

[30] Foreign Application Priority Data
Feb. 27, 1970   Great Britain...................... 9493/70

[52] U.S. Cl.......... 343/5 ST, 343/5 EI, 343/112 CA
[51] Int. Cl................................................ G01s 9/02
[58] Field of Search............ 343/5 ST, 5 EI, 112 CA

[56] References Cited
UNITED STATES PATENTS

| | | | |
|---|---|---|---|
| 3,109,060 | 10/1963 | Beach et al. ...................... | 343/5 ST |
| 2,804,613 | 8/1957 | Haworth............................ | 343/5 ST |
| 3,212,086 | 10/1965 | Robinson .......................... | 343/5 ST |
| 3,191,172 | 6/1965 | Watt.................................. | 343/5 ST |
| 3,146,441 | 8/1964 | Miller................................ | 343/5 ST |

OTHER PUBLICATIONS

G. F. J. Garlick et al., "Studies of The Mechanism of The Thorn Image Retaining Panel," Brit. J. Appl. Phys., April 1969, pp. 501–508.

Primary Examiner—Maynard R. Wilbur
Assistant Examiner—G. E. Montone
Attorney, Agent, or Firm—Elliott I. Pollock

[57] ABSTRACT

A ship's radar includes an electrically-energized image-retaining panel that is exposed repeatedly to a relative-motion plan-position echo-display on a cathode-ray-tube screen so as to retain time-separated images of the display superimposed upon one another. The panel, which emits light to display the cumulatively-retained images, is moved along coordinate axes relative to the cathode-ray tube in accordance with the ship's North-South and East-West components of motion, and is scanned via a partially-transparent mirror by a stationary television camera. The cathode-ray-tube display is superimposed via the mirror on to the panel display as scanned by the camera, and the video signals derived are applied to a television monitor to provide a bright plan-position picture in which only moving-objects have rearwardly-extending true-track 'tails,' and the ship itself always appears at the center.

26 Claims, 3 Drawing Figures

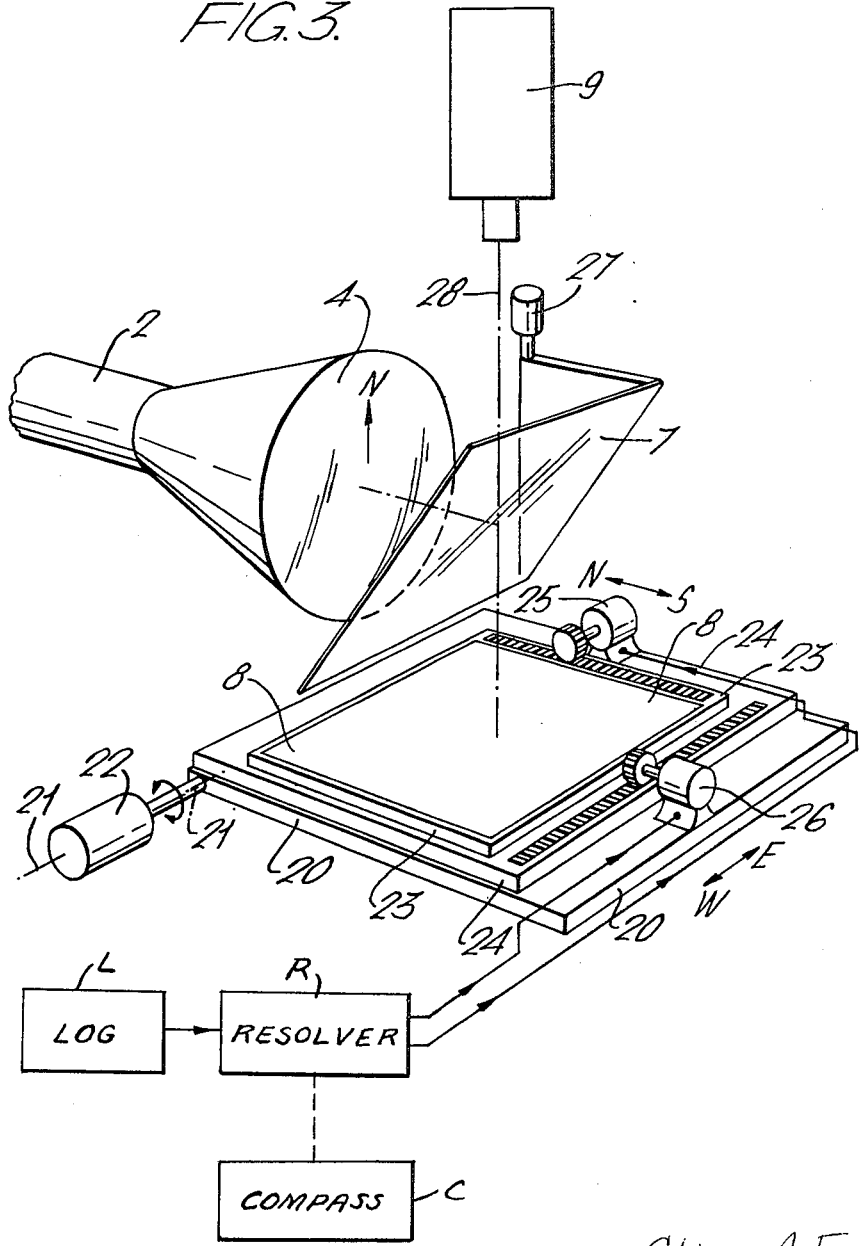

ID
TELEVISED TRUE-MOTION RADAR WITH TRACK HISTORY

BACKGROUND OF THE INVENTION

This invention relates to echo-receiving and -display apparatus as used, for example, in radar systems. The invention is especially, though not exclusively, applicable to the display of radar information in a ship.

Radar information is conventionally displayed in a ship as a plan-position display in which the objects or 'targets' from which the radar echoes are received, are represented on the screen of a cathode-ray tube with radial and angular displacements from a reference point, corresponding to their individual ranges and bearings from the radar-carrying ship. In the basic form of display the reference point, representing the radar-carrying ship, remains stationary on the cathode-ray-tube screen and the representations of targets, whether these targets are stationary or not, move across the screen. The movement in each case is in accordance with the movement of the target relative to the radar-carrying ship and represents the vector difference between the true movements of the ship and target. In the latter respect therefore, it is not readily possible to distinguish in the display between the targets that are actually moving and those, such as buoys and the coast-line, that are stationary. This movement of the representations of stationary targets can give rise to smearing or blurring that reduces clarity of the display and may even obscure other target representations. Even apart from considerations of clarity and discrimination, the true direction and speed of any target can only be determined from the relative-motion display by plotting its position over a period of some minutes and then constructing an appropriate velocity-vector triangle based on the known speed and direction of the radar-carrying ship.

A true-motion display is often used instead of the basic, relative-motion form, and in this the representation of each moving object, including that of the radar-carrying ship, is caused to move across the cathode-ray-tube screen in true accord with its actual direction and speed of movement. The representations of all stationary objects remain stationary on the screen and are thereby readily distinguishable from moving targets without any smearing. There is however the disadvantage that it is not possible with this form of display to obtain an immediate appreciation of the rates of change of range and bearing of any target with respect to the radar-carrying ship. These rates are of importance in any assessment of the risk of collision and whereas they can be indicated using plotting and constructional techniques, the execution of such techniques, especially where a large number of targets is involved, is both tedious and time consuming.

It is one object of the present invention to provide display apparatus of the kind specified that may be used to overcome the disadvantages of both the relative- and true-motion displays.

SUMMARY OF THE INVENTION

According to one aspect of the present invention, apparatus for displaying echoes received by a moving craft from objects within an area of surveillance, includes display means such as for example a cathode-ray tube, to provide in accordance with the received echoes a display representation changing with time of the relative locations of the objects within the surveillance area, and an image-retaining device that is mounted for exposure (intermittently or continuously) to the display representation. The image-retaining device, which is operative to retain images of light patterns to which it is exposed and to emit light in accordance with the retained images, retains cumulatively, and thereby displays, superimposed images of the time-changing display representation. The apparatus also includes means to effect relative displacement between the display means and the image-retaining device in accordance with movement of the craft so that the resultant display provided by the image-retaining device is dependent on this movement. The relative displacement, which may be effected by moving the image-retaining device only, by moving the display means only, or by moving both, may conveniently be applied along coordinate axes and may be derived in accordance with movements of the craft along earth-defined axes.

The display provided by the image-retaining device is composed of superimposed, but relatively-displaced, images of the display representation provided from the received echoes, and in this way can readily provide an historical record of the movements of the objects. In particular where the display means provides a relative-motion display, the display derived from the image-retaining device can be readily arranged to represent the objects in their true, current positional-relationship to the craft, with the representation of the radar-carrying craft maintained at a stationary (and, if desired, centrally-located) point and with lines or 'tails' extending rearwardly from the representations of the craft and the other moving objects to show their true tracks. Since the craft-representation is stationary an immediate appreciation of the rates of change of range and bearing to any other object can be obtained just in the same way as with the conventional relative-motion display. However, in the present case the added lines or 'tails,' indicating the true tracks of the moving objects and built up from the cumulative effect of superimposition of successive, earlier images on one another, enable the speeds and true directions of movement of all moving objects to be quickly and easily deduced. Stationary objects appear in the display without any rearwardly-extending 'tail' and can by this be readily distinguished from moving objects, so that in all these respects the display provided combines advantages individual to both the relative- and true-motion displays without the attendant disadvantages referred to above.

The display provided by the image-retaining device may be scanned by a television camera and relayed to one or more television display or monitor units.

In the latter respect, and according to another object of the invention, there is provided apparatus whereby an echo-display provided on the screen of a cathode-ray tube in for example a radar system, may be successfully televised. This object is fulfilled according to the invention by using an image-retaining device that is exposed to the cathode-ray tube display to retain an image of this display, and a television camera that is arranged to scan the image retained to derive the desired television video-signals. The image-retaining device may be exposed to the screen of the cathode-ray tube intermittently or continuously. Similarly the image retained by the image-retaining device may be scanned intermittently or continuously by the television camera.

With a radar plan-position display provided on the screen of a cathode-ray tube there is in general too large a variation in the intensity of light emitted from the display to enable a useful picture to be derived by direct televising of the screen. The normal viewing of the display depends to a significant extent on the ability of the human eye to integrate the light received from any particular spot on the cathode-ray-tube screen, and thereby retain good vision of it between successive sweeps of the rotating time-base trace. A television camera does not have the same integrating ability, and the video signals it derives when used to scan the cathode-ray-tube screen are inadequate for reproduction of the radar information with the required picture detail and clarity. The present invention however, makes the use of closed-circuit television for displaying radar information, a practical and economic possibility that is of especial value in relation to air-traffic control as well as marine navigation. The television video-signals derived can be used to provide a bright picture that is clearly visible in normal daylight or in normal artificial-lighting conditions, and so the need for the navigation officers or controllers to adapt to work in the low levels of ambient lighting normally associated with radar viewing, can be avoided.

BRIEF DESCRIPTION OF THE DRAWINGS

A radar system that includes apparatus in accordance with the present invention, will now be described, by way of example, with reference to the accompanying drawings, in which:

FIG. 3 is a perspective view illustrative of the mounting arrangement of the image-retaining panel in the radar system of FIG. 1.

DESCRIPTION OF THE PREFERRED EMBODIMENTS

The radar system to be described is for use on a ship to provide a display that is of assistance in navigation.

Figure 1:
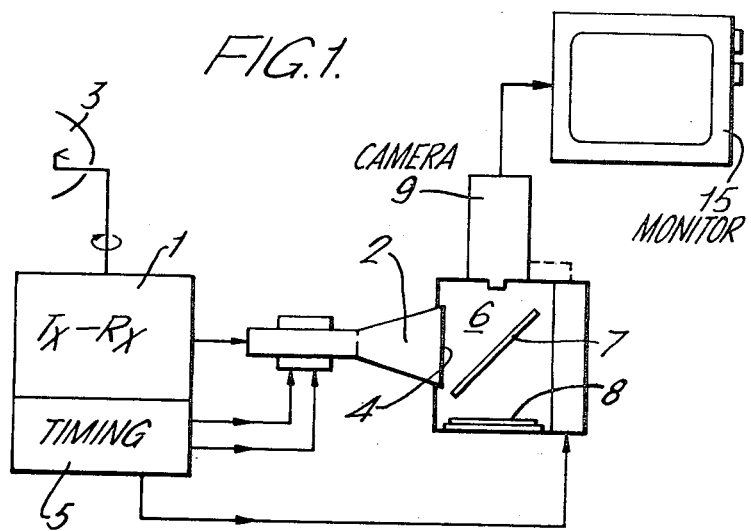
FIG. 1 is a schematic representation of the radar system.

Referring to FIG. 1, a radar transmitter-receiver 1 supplies to a cathode-ray display-tube 2 video signals corresponding to radio-frequency echo-signals that are received by an aerial 3 of the system. The aerial 3 rotates to receive echo-signals from all directions in azimuth, and the tube 2, in accordance with the video signals supplied to it sequentially by the transmitter-receiver 1, provides on its screen 4 an intensity-modulated plan-position display of the received echo-signals. A timing unit 5 associated with the transmitter-receiver 1 supplies to the tube 2 signals that produce at the screen 4 the rotating, and appropriately synchronized, radial time-base required to produce such display of the sequentially-applied video signals.

The screen 4 is positioned within a light-tight box 6, and within the box 6 is associated with a partially-transparent mirror 7 and an image-retaining panel 8. The mirror 7 and the image-retaining panel 8 are both pivotally mounted, the mirror 7 being so mounted that it may be pivoted from a position (as shown) in which it reflects light from the screen 4 to a television camera 9, to a position in which it does not obstruct upward movement of the image-retaining panel 8. The panel 8, in this latter respect, is mounted such that it may be pivoted from the position (as shown) in which it is exposed to the camera 9 through the mirror 7, to a position in which it is in face-to-face contact with the screen 4 of the cathode-ray tube 2. The screen 4 is in this respect preferably provided as a glass-fibre optical face-plate so that the exposure of the panel 8 may be as free from distortion as possible.

Figure 2:
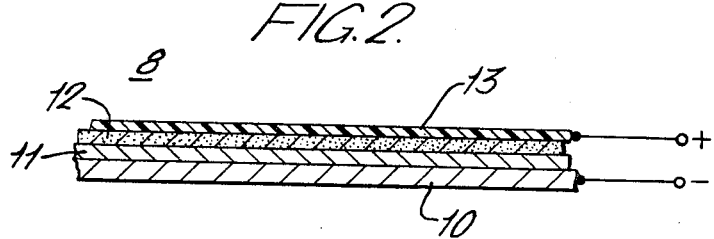
FIG. 2 is a sectional side elevation of an image-retaining panel used in the radar system of FIG. 1.

The image-retaining panel 8 is of a form sold by Thorn Electrical Industries Limited and described in a paper entitled "The Image Retaining Panel," by A. S. Henderson, published in the journal "New Scientist," Volume 16, pages 686 to 688, and also in a paper entitled "Studies of the mechanism of the Thorn image-retaining panel" by G. F. J. Garlick, R. Harvey, P. J. Clewer and P. W. Ranby, published in the British Journal of Applied Physics, 1969, Series 2, Volume 2. As shown in FIG. 2 of the drawings accompanying the present specification, the panel 8 has a metal substrate 10 that carries two superimposed vitreous-enamel layers 11 and 12. The uppermost layer 12 is embedded with an electroluminescent phosphor (basically zinc-cadmium sulphide) and is coated with an electrically-conductive transparent film 13. Unidirectional voltage is applied between the substrate 10 and film 13 (film 13 being positive with respect to substrate 10), and under these conditions irradiation of any area of the layer 12 with light, causes a yellowish glow to build up in that area in proportion to the intensity and duration of the irradiation. The emission of light is sustained after irradiation ceases, so the panel 8 has an effective memory by which it retains any image to which it is exposed. The image is retained in this way, without any serious deterioration in sharpness and contrast, for a period of many (for example, 20) minutes provided that the application of the unidirectional voltage is uninterrupted; if there is interruption of the applied voltage for even a second or so, the image is no longer retained. Except where otherwise stated in the following description, it is assumed that unidirectional voltage is appropriately applied to the panel 8 without interruption.

Referring again to FIG. 1, the pivotting of the panel 8 into face-to-face contact with the screen 4 exposes the panel 8 to the plan-position display on the screen 4. An image of this display is accordingly retained by the panel 8, and this image as superimposed on the reflected image of the display on the screen 4, is scanned by the television camera 9 through the mirror 7. The video signals derived by the camera 9 are supplied to a television monitor unit 15 (which may be one of a number of such units) that has a large (for example, 23 inch) television screen and provides a bright, high-contrast picture of the superimposed display-images that is clearly visible to the navigation officer of the ship even under normal daylight conditions. This picture may provide the radar information in black on a white background or vice versa.

The picture presented to the navigation officer is a composite plan-position display of the information currently appearing on the screen 4 superimposed with the information retained by the panel 8 from its earlier exposure to the screen 4. The panel 8 is pivoted up into face-to-face contact with the screen 4 recurrently throughout operation and thereby builds up an historical record of target-movements within the area under radar-surveillance. Movement of a target appears in this record as a succession of dots that in general merge to form a line. This line in the composite display is headed by a dot that indicates the present position of the target, and (since it results from exposure of the camera 9 to the screen 4 via the mirror 7) is readily distinguishable from the other markings by its greater intensity. The direction along the line towards this head dot is indicative of the direction of movement of the target, and the length of the line is indicative of the speed of target-movement (or at least, of the distance travelled in the relevant period). More specifically, the composite display shows the current positions of the targets relative to the radar-carrying ship with the representation of the radar-carrying ship maintained at the center of the display and with 'tails' extending rearwardly from the representations of the targets and radar-carrying ship to indicate their true tracks. The presentation of this composite display by the television monitor unit 15 is as a 'compass-stabilized ship's head-up' display, that is to say such that the heading of the radar-carrying ship as this appears in the display is fixed in an upward direction (normally aligned with the forward direction along the ship itself) from the center to the top of the picture-screen, and such that normal short-period disturbances to the ship's heading do not affect the picture. The manner in which all this is achieved will be described in greater detail with reference to FIG. 3.

Referring to FIG. 3, the panel 8 is mounted on a platform 20 that is pivotted about an axis 21, and the pivotting of the panel 8 up to, and away from, face-to-face contact with the screen 4 is achieved by appropriate energization of an actuator 22 coupled to the platform 20 on the axis 21. The mounting of the panel 8 allows for movement across the platform 20 so that the face-to-face registration of the panel 8 with the screen 4 is variable. In this respect the panel 8 is fixed within a sub-frame 23 of a frame 24, the frame 24 being confined on the platform 20 to movement parallel to the axis 21, and the sub-frame 23 being confined on the frame 24 to movement perpendicular to the axis 21. Movements of the sub-frame 23 with respect to the frame 24 and of the frame 24 with respect to the platform 20, are controlled by actuators 25 and 26 that are energized in accordance respectively with signals representative of the North-South and East-West components of the ship's movement. These signals are derived (in the normal manner used where a true-motion display is provided) from a resolver R that is set from the ship's compass system C in accordance with the compass-heading or track of the ship and is supplied from the ship's log L with a signal representative of the ship's speed. The resultant movement of the panel 8 relative to the platform 20 is thus in accordance with the ship's own movement, so that when the panel 8 is pivotted up into face-to-face contact with the screen 4, the shift in registration of the panel 8 with the screen 4 that has taken place since they were last in contact is in accord with the ship's movement in the intervening interval.

The display provided on the screen 4 is a relative-motion plan-position display that is compass-stabilized to maintain the North-South direction perpendicular to the axis 21. The radar-carrying ship in this display is represented as a stationary dot at the center of the screen 4, and the movements of the panel 8 across the platform 20 are made parallel and perpendicular to the axis 21 in reverse senses, such that the consequent shift in registration of the panel 8 with this center is along the reciprocal of the ship's track. These movements are halted temporarily while the platform 20 is pivotted up with the panel 8 in face-to-face contact with the screen 4, so as to avoid smudging of the retained image.

The panel 8 is held in contact with the screen 4 for one complete sweep of the radial time-base around the full circle, a period of some 3 seconds. The mirror 7 prior to this is pivotted back out of the way of the platform 20, by means of an actuator 27, and is returned to the position shown in FIG. 3 only after the platform 20 has been pivotted back about the axis 21. The camera 9, which throughout the pivotal movement of the platform 20 and mirror 7 is blanked off, now scans the composite display-image presented to it by the mirror 7, this image being formed by the retained image of the panel 8 as exposed through the mirror 7 and superimposed upon the reflected image from the screen 4. The scanning continues for some fifteen seconds and is then terminated while the mirror 7 is pivotted out of the way and the platform 20 is then pivotted up about the axis 21 to bring the panel 8 into face-to-face contact with the screen 4 once more. Scanning continues when 3 seconds later the platform 20 and mirror 7 are pivotted back. The whole process of exposing the panel 8 to update the historical record it retains, and then scanning this as superimposed on the current display provided on the screen 4, is executed in a recurrent cycle of 18 seconds duration. Calibration and bearing rings, together with a heading line extending from the center of the display in the direction of the ship's compass-heading, are displayed by the cathode-ray tube 2 only during that part of the cycle following exposure of the panel 8 to the screen 4, and synchronization of the successive steps in the cycle with the overall operation of the radar system, is controlled by the timing unit 5.

The television camera 9 is mounted for rotation about its viewing axis 28 so that its orientation with respect to the mirror 7, and therefore with respect to the North-stabilized displays provided by the tube 2 and panel 8, can be varied. Rotation of the camera 9 about the axis 28 is controlled by the ship's compass system (not shown) so that as there is a change in the compass-heading of the ship the camera 9 is rotated to make a corresponding change in its orientation with respect to the NOrth-stabilized displays. The rotation is made in the appropriate sense to maintain the compass-heading of the radar-carrying ship as represented in the resultant television picture, in the fixed direction from the center to the top of the monitor screen.

The need to rotate the camera 9 might possibly be avoided by using an optical system positioned between the camera 9 and the mirror 7 and itself rotated instead of the camera 9 to achieve the desired effect. However, the same effect can be achieved more readily by mounting the monitor unit 15 for at least partial rotation about a vertical or horizontal axis so that the whole unit 15 can be rotated by the navigation officer to effect the desired alignment. The electrical connections to the unit 15 involve simply a video-input cable (shown in simplified from in FIG. 1) and a power-supply cable (not shown), and there is accordingly no great difficulty associated with mounting the unit 15 for rotation through, for example, some 365° or 400°.

The historical record provided by the panel 8 can be erased and restarted simply by interrupting the application of the unidirectional voltage to the panel 8. It may be arranged that the process of erasure and restarting is effected automatically; in particular, it may be effected repeatedly at any selected one of a number of frequencies, for example, every 3, 6 or 12 minutes. Clearly it is necessary to reset the position of the panel 8 on the platform 20 periodically, and erasure of the image retained by the panel 8 is effected automatically with each resetting, by interruption of the applied voltage.

It has been found that the image retained by the panel 8 can be markedly improved in sharpness and contrast by exposing the panel 8 to a flash of high-intensity light following its exposure to the display on the screen 4. In this respect, an electric lamp (not shown) is mounted in the box 6 and is energized to produce a short-duration high-intensity flash towards the end of the movement of the platform 20 back away from the screen 4 following exposure of the panel 8 to the screen 4, and while the camera 9 remains blanked off.

The need to blank off the television camera 9 for the period of 3 seconds during each cycle of operation has the unfortunate effect of interrupting the composite-display picture provided by the monitoring unit 15. This effect may be mitigated to some extent by using a television display-tube having long-persistence characteristics, or by incorporating a form of picture storage device into the television circuit itself or elsewhere in the display apparatus. More specifically, continuity of display may be maintained by providing the system with two arrangements such as that shown in FIG. 3, connecting them to the same monitor unit to provide superimposed pictures, and operating them out of step with one another so that the blanking period of one is overlapped by the scanning period of the other.

It may be found necessary to incorporate various lenses into the arrangement shown in FIG. 3 to correct for distortion of the composite image scanned by the television camera 9.

Although in the arrangement described above the panel 8 is moved in accordance with the ship's movements, this is not essential; the tube 2 could be moved instead. Alternatively it may be found preferable to move both the tube 2 and the panel 8; for example the tube 2 may be moved in accordance with one component of the ship's movement and the panel 8 in accordance with the other component.

The invention has been described above in relation to a radar system, and although it is of particular merit in this context, it is to be understood as being of wider application than this. For example, it may be applied to display arrangements of sonar systems, and in more general areas where echo-information is to be displayed.

I claim:

1. Apparatus for displaying echoes received by a moving craft from objects within an area of surveillance, comprising display means to provide in accordance with the received echoes a display representation changing with time of the relative locations of the objects within the surveillance area, an image-retaining device operative to retain images of light patterns to which it is exposed and to emit light in accordance with the retained images, means mounting the image-retaining device for exposure to the said display representation, and means operable to expose the image-retaining device to said display representation intermittently to retain cumulatively and thereby display, superimposed images of the said time-changing display representation, the apparatus including means to effect relative displacement between the display means and the image-retaining device in accordance with movement of the craft.

2. Apparatus according to claim 1 wherein said display means comprises means operative to provide a relative-motion plan-position display of said echoes.

3. Apparatus according to claim 1 wherein said means for effecting relative displacement is means for moving the image-retaining device with respect to the display means.

4. Apparatus according to claim 1 including television-camera means for scanning the superimposed images displayed by said image-retaining device to derive television video-signals in accordance therewith.

5. Apparatus according to claim 4 wherein said means for effecting relative displacement includes drive means for moving the image-retaining device with respect to both the display means and the television-camera means.

6. Apparatus according to claim 5 including means constraining movement of said image-retaining device to movements along coordinate axes, said drive means comprising means for moving the image-retaining device along one of the axes and further means for moving the image-retaining device along the other axis.

7. Apparatus according to claim 4 including partially-transparent reflecting means mounted adjacent the image-retaining device, and means mounting the television-camera means to scan the image-retaining device via the partially-transparent reflecting means.

8. Apparatus according to claim 1 wherein said image-retaining device includes a layer of ceramic material having an extended surface embedded with electroluminescent material, and electrodes for applying unidirectional voltage across the layer, and wherein said mounting means mounts the image-retaining device to expose said surface of said layer to the display representation provided by said display means.

9. Apparatus according to claim 8 wherein said ceramic material is a vitreous-enamel material.

10. Apparatus according to claim 1 including means for viewing the superimposed - image display provided by said image-retaining device, and means for superimposing additional information on this display as viewed via said viewing means.

11. Apparatus according to claim 10 wherein said viewing means includes a partially-transparent reflecting means.

12. Radar apparatus for use on a moving craft, comprising means for receiving echoes from objects within a region of radar surveillance, display means for providing a plan-position display of the received echoes, an image-retaining device having a light-emitting surface, said image-retaining device being operable electrically to retain images of light patterns to which it is exposed and to emit light from said surface with a distribution thereacross in accordance with the retained images, means mounting the image-retaining device for exposure to the display means to retain cumulatively and thereby display from said surface superimposed images of the plan-position display, and means for effecting relative displacement between the display means and the image-retaining device in accordance with craft movement, said last-named means including means constraining the image-retaining device to movement along coordinate axes, and means for moving the image-retaining device along said axes in accordance respectively with movements of the craft along earth-defined axes.

13. Radar apparatus according to claim 12 including television-camera means to scan the said surface and derive television video-signals in accordance with the display provided from said surface, and at least one television-display means to provide a picture display in accordance with the video signals.

14. Radar apparatus according to claim 12 wherein said display means comprises means to provide a relative-motion display of said echoes.

15. Radar apparatus according to claim 14 including television-camera means to scan said surface and derive television video-signals in accordance with the display provided from said surface, and wherein said means for effecting relative displacement includes means to move the image-retaining device with respect to both the display means and the television-camera means.

16. Apparatus comprising means for receiving echoes from objects within a region of surveillance, a cathode-ray tube having a screen and being operative to provide a display in accordance with the echoes received, an image-retaining device having a light-emitting surface, said image-retaining device being operable electrically to retain images of light patterns to which it is exposed and to emit light from said surface with a distribution thereacross in accordance with the retained images, means mounting the image-retaining device for exposure to the display provided on the screen of the cathode-ray tube, and television-camera means for scanning the said surface to derive television video-signals in accordance with the light patterns emitted thereby.

17. Apparatus according to claim 16 wherein said image-retaining device includes a layer of ceramic material embedded with electroluminescent material, and electrodes for applying unidirectional voltage across the layer.

18. Apparatus according to claim 17 wherein said ceramic material is a vitreous-enamel material.

19. Apparatus according to claim 17 wherein said electroluminescent material is a zinc-cadmium sulphide.

20. Apparatus according to claim 16 wherein said image-retaining device comprises a metal substrate, two layers of ceramic material superimposed upon one another on the metal substrate, electroluminescent material embedded in the uppermost of the two layers, and a transparent electrode on the uppermost layer.

21. Apparatus according to claim 20 wherein the two said layers are of vitreous enamel.

22. Apparatus according to claim 16 including at least one television display means to provide a picture display in accordance with said video signals.

23. Radar apparatus comprising means for receiving echoes from objects within a region of radar surveillance, a cathode-ray tube having a screen and being operative to provide on said screen a plan-position display of the received echoes, an image-retaining panel that includes electroluminescent material, said panel being operable electrically to retain a cumulative image of light patterns to which it is exposed and to emit light patterned in accordance with the cumulative image retained, means for exposing the panel to the plan-position display provided by said cathode-ray tube, and television-camera means for scanning said panel to provide television video-signals in accordance with the cumulative image retained by the panel.

24. Radar apparatus according to claim 23 wherein said panel comprises a metal substrate, two vitreous-enamel layers superimposed upon one another on the substrate, electroluminescent material embedded in the uppermost of the two layers on the substrate, and a layer of electrically-conductive and transparent material carried by the uppermost vitreous-enamel layer.

25. Radar apparatus according to claim 23 including means for effecting relative displacement between the cathode-ray tube and the image-retaining panel.

26. Apparatus for use with a moving craft, comprising means for receiving echoes from objects within a region of surveillance from the craft, a display device having a screen and being operative to provide a display on said screen in accordance with the echoes received, an image-retaining device having a light-emitting surface, said image-retaining device being operable electrically to retain images of light patterns incident on said surface and to emit light from said surface with a distribution thereacross in accordance with the retained images, means mounting the image-retaining device for exposure to the display provided on said screen so as to cause light in the image of that display to be incident on said surface, displacement means operable to effect relative displacement between the image-retaining device and said incident image of the display, means for operating said displacement means to effect said relative displacement in accordance with the craft movement, and camera means for viewing the said surface to derive electric video-signals in accordance with the light patterns emitted from said surface.

* * * * *